(12) United States Patent
Parisis et al.

(10) Patent No.: US 7,729,505 B2
(45) Date of Patent: Jun. 1, 2010

(54) METHOD AND DEVICE FOR WATERMARKING AN IMAGE

(75) Inventors: Alice Parisis, Tours (FR); Philippe Carre, Poitiers (FR); Nathalie Laurent, Vignoc (FR)

(73) Assignee: France Telecom, SA, Paris (FR)

( * ) Notice: Subject to any disclaimer, the term of this patent is extended or adjusted under 35 U.S.C. 154(b) by 984 days.

(21) Appl. No.: 10/578,337

(22) PCT Filed: Oct. 26, 2004

(86) PCT No.: PCT/FR2004/002756

§ 371 (c)(1),
(2), (4) Date: Jul. 21, 2006

(87) PCT Pub. No.: WO2005/048189

PCT Pub. Date: May 26, 2005

(65) Prior Publication Data

US 2007/0140523 A1  Jun. 21, 2007

(30) Foreign Application Priority Data

Nov. 10, 2003 (FR) .................................. 0313171

(51) Int. Cl.
*G06K 9/00* (2006.01)
*G06K 9/36* (2006.01)

(52) U.S. Cl. ...................... 382/100; 358/3.28; 713/176; 348/589; 382/233

(58) Field of Classification Search ........................ None
See application file for complete search history.

(56) References Cited

U.S. PATENT DOCUMENTS 6,332,030 B1 * 12/2001 Manjunath et al. .......... 382/100
6,993,149 B2 * 1/2006 Brunk et al. ................ 382/100

(Continued)

OTHER PUBLICATIONS

Ki Ryong Kwon et al, "Adaptive Watermarking Using Successsive Subband Quantization and Perceptual Model Based on Multiwavelet Transform", 2002, SPIE vol. 4675 pp. 334-348.*

(Continued)

*Primary Examiner*—Yubin Hung
*Assistant Examiner*—Avinash Yentrapati
(74) *Attorney, Agent, or Firm*—Gerald E. Helget; Nelson R. Capes; Briggs and Morgan, P.A.

(57) ABSTRACT

The invention concerns a method of inserting a watermark in an image comprising at least three components, the method comprises the steps of decomposing at least one component of the image into detail sub-bands in various directions and comprising coefficients, each coefficient being characterized by its position in the detail sub-band to which it belongs and its amplitude, of determining, for each position, information representing local amplitude variations from the amplitudes of the coefficients at this position in the various detail sub-bands and the coefficients close to this position in the various detail sub-bands, of determining a watermarking strength at each position from the information representing determined local amplitude variations in the said position and inserting a watermark composed of a plurality of binary information in the image, inserting each item of binary information at a position on the image according to the watermarking strength determined for a position corresponding to the position at which the binary information is inserted.

14 Claims, 6 Drawing Sheets

U.S. PATENT DOCUMENTS

| | | | |
|---|---|---|---|
| 7,072,487 B2* | 7/2006 | Reed et al. | 382/100 |
| 2002/0106103 A1* | 8/2002 | Jones et al. | 382/100 |
| 2003/0068068 A1* | 4/2003 | Kim et al. | 382/100 |
| 2004/0105569 A1* | 6/2004 | Sharma et al. | 382/100 |
| 2004/0125983 A1* | 7/2004 | Reed et al. | 382/100 |
| 2004/0136565 A1* | 7/2004 | Hannigan et al. | 382/100 |
| 2004/0175017 A1* | 9/2004 | Bodo et al. | 382/100 |
| 2004/0186816 A1* | 9/2004 | Lienhart et al. | 706/20 |
| 2004/0228502 A1* | 11/2004 | Bradley et al. | 382/100 |
| 2004/0247154 A1* | 12/2004 | Bodo et al. | 382/100 |
| 2004/0264736 A1* | 12/2004 | Parisis et al. | 382/100 |

OTHER PUBLICATIONS

SG Chang et al, "Spatially Adaptive Wavelet Thresholding With Context Modeling for Image Denoising", IEEE Transactions on Image Processing vol. 9 No. 9 Sep. 2000 pp. 1522-1531.*

Sam Kwong et al, "Wavelet domain adaptive Visible watermarking", Electronic Letters, Sep. 27, 2001, vol. 37 pp. 1219-1220.*

Ki Ryong Kwon; Tewfik A H: "Adaptive watermaking using successive subband quantization and perceptual model based on multiwavelet transform," Security and Watermaking of Multimedia Contents IV, vol. 4675, Jan. 21, 2002, pp. 334-348, San Jose, CA, USA.

Caramma M. et al.: "A blind and readable watermaking technique for color images," Proceedings of the $7^{th}$ IEEE International Conference on Image Processing, vol. 1, Sep. 10, 2000, pp. 442-445, Milan, Italy.

Barni M. et al.: "A DWT-based technique for spatio frequency masking of digital signatures," Proceedings of the SPIE Conference on Security and Watermarking of Multimedia Contents, vol. 3657, Jan. 24, 1999, pp. 31-39, San Jose, CA, USA.

\* cited by examiner

| Classe/comp | R | V | B |
|---|---|---|---|
| 1 | 0 | 0 | 0 |
| 2 | 0,7 | 0,4 | 0,7 |
| 3 | 0,7 | 0,4 | 0,7 |
| 4 | 0,7 | 0,4 | 0,7 |
| 5 | 0,9 | 0,5 | 0,9 |

METHOD AND DEVICE FOR WATERMARKING AN IMAGE

BACKGROUND OF THE INVENTION

The present invention concerns a method and device for watermarking an image comprising at least three components.

It also concerns a method and device for detecting a signature inserted in an image comprising at least three components.

The invention is situated in the field of watermarking, images comprising several components such as for example color images. These watermarking techniques can for example be used for protecting copyright on a digital image.

The watermark inserted in an image must amongst other things be robust to the various manipulations of the image. Such manipulations are for example compression thereof.

The watermark inserted in an image must also be imperceptible in order to preserve the quality of the image.

In the French patent application filed under the number 0304592 by the present applicant and not yet published there are described a method and device for watermarking a colored image by vector approximation, taking account of its color dimension.

SUMMARY OF THE INVENTION

According to this application, the watermarking of an image is carried out according to an insertion rule taking into account the relevant positions of three component vectors.

According to this technique, the watermarking is carried out according to a watermarking strength that can be adapted according to the colorimetric or texture characteristics of the image.

The inventors of the present invention have remarked that the watermarking as presented in this application may, in certain cases, be visible when it is wished to increase the robustness of the watermark. In the contrary case, the watermarking is not very robust when it is wished to make the watermarking invisible.

The aim of the invention is to resolve the drawbacks of the prior art by proposing a method and device for inserting a watermark in an image which is both invisible and more robust than the prior art.

To this end, according to a first aspect, the invention proposes a method of inserting a watermark composed of a plurality of binary information in an image comprising at least three components, the method comprising the steps of:

decomposing at least one component of the image into detail sub-bands according to various directions and comprising coefficients, each coefficient being characterized by its position in the detail sub-band to which it belongs and its amplitude, determining, for each position, information representing local amplitude variations in various directions from amplitudes of the coefficients at the position in the various detail sub-bands and coefficients close to the position in the various detail sub-bands, determining a watermarking strength at each position from information representing local amplitude variations in various directions determined for the position, forming, for each position and for each component, a vector whose coordinates are the amplitudes of the coefficients at the position in the various detail sub-bands of the component, selecting, for each position, one vector amongst the vectors formed for the position, watermarking the image by modifying, for each position, the amplitude of the coefficients which are the coordinates of the vector selected for the position according to the binary information corresponding to the position and according to the watermarking strength determined for the position.

Correspondingly, the invention concerns a device for inserting a watermark composed of a plurality of binary information in an image comprising at least three components, the device comprising:

means of decomposing at least one component of the image into detail sub-bands in various directions and comprising coefficients, each coefficient being characterized by its position in the detail sub-band to which it belongs and its amplitude, means of determining, for each position, information representing local amplitude variations in various directions from amplitudes of the coefficients at the position in the various detail sub-bands and coefficients close to the position in the various detail sub-bands, means of determining a watermarking strength at each position from information representing local amplitude variations in various directions determined for the position, means of forming, for each position and for each component, a vector whose coordinates are the amplitudes of the coefficients at the position in the various detail sub-bands of the component, means of selecting, for each position, one vector amongst the vectors formed for the position, means of watermarking the image by modifying, for each position, the amplitude of the coefficients which are the coordinates of the vector selected for the position according to the binary information corresponding to the position and according to the watermarking strength determined for the position.

Thus, by determining information representing local amplitude variations in various directions at each position of the detail sub-bands and determining a watermarking strength at each position from information representing local amplitude variations in the various directions determined, it is possible to insert binary information in an optimum fashion and thus obtain a watermark in an image which is both robust and invisible.

This is because, by determining information representing local amplitude variations in various directions, it is possible to adjust the watermarking for all amplitude variations, even for local amplitude variations along the diagonal directions.

The energy associated with these diagonal directions being lower than the horizontal and vertical directions, the present invention nevertheless takes into account the amplitude variations in these directions for determining the strength of the marking at these positions. Such a determination thus makes it possible to adjust the watermarking strength in each direction of the amplitude variations.

The greater the number of items of information inserted in the image, the more robust is the watermarking, and the more adapted the watermarking strength is to the local particularities of the image, the less visible is the watermark inserted.

According to another aspect of the invention, each component of the image is broken down into detail sub-bands in various directions, the information representing amplitude variations is determined for each component and for each position, and the watermarking strength is determined at each position of each component.

According to another aspect of the invention, the determination of the information representing local amplitude variations for each component and for each position is broken down into a squaring of the amplitude of each coefficient of each detail sub-band of each component and the calculation of a median value, from the squared amplitudes of the coefficient and the coefficients close to the coefficient, for each coefficient of each detail sub-band of each component.

Thus, by squaring the amplitudes of the coefficients, a concept of energy is introduced into the coefficients of the sub-band. They can then be considered to be indicators of the change in energy in the image.

In addition, by calculating for each coefficient its median value, the zones of the sub-bands comprising high variations in amplitude are revealed whilst avoiding any detections of breaks in contours.

According to another aspect of the invention, the determination of the watermarking strength at each position of each component is made by forming a vector whose coordinates are the median values calculated in each detail sub-band, containing the vectors whose coordinates are similar in predetermined classes and allocating a watermarking strength to each position according to the predetermined class to which the vector of the position belongs.

According to another aspect of the invention, the predetermined classes are the class containing the vectors representing zones not comprising any variations and/or the class containing the vectors representing zones of the image comprising variations that are mostly horizontal, and/or the class containing the vectors representing zones of the image comprising variations that are mainly vertical and/or the class containing the vectors representing zones of the image comprising variations that are mainly diagonal, and/or the class containing the vectors representing zones of the image that are very highly textured and without any particular direction.

Thus, by using a large number of classes, it is possible to precisely determine the local amplitude variations and thus to adapt the watermarking strength accordingly.

According to another aspect of the invention, the watermarking strength is also allocated according to the component of the image and the decomposition is a Haar wavelet decomposition.

Thus it is possible to adjust the watermark by taking account of the properties of the human visual system. In addition, the Haar wavelet is particularly well suited to detecting texture since it does not reveal edge effects on the image whilst being simple in its implementation.

According to another aspect of the invention, during the watermarking, each component of the image is decomposed, according to another decomposition into sub-bands, into sub-bands comprising coefficients, each coefficient being characterized by its position in the sub-band to which it belongs and its amplitude and in that the method also comprises a step of reconstructing the image from coefficients of the sub-bands and coefficients whose amplitudes have been modified.

The invention also concerns a method of detecting a signature inserted in an image comprising at least three components, characterized in that the method comprises the steps of decomposing at least one component of the image into detail sub-bands in various directions and comprising coefficients, each coefficient being characterized by its position in the detail sub-band to which it belongs and its amplitude; determining, for each position, information representing local amplitude variations in various directions from the amplitudes of the coefficients at this position in the various detail sub-bands and coefficients close to this position in the various detail sub-bands and detecting the signature from at least some binary information inserted in a plurality of positions of the image and information representing the local amplitude variations in various directions corresponding to the positions of the binary information.

Correspondingly, the invention proposes a device for detecting a signature inserted in an image comprising at least three components, characterized in that the device comprises means of decomposing at least one component of the image into detail sub-bands in various directions and comprising a coefficient, each coefficient being characterized by its position in the detail sub-band to which it belongs and its amplitude; means of determining, for each position, information representing local amplitude variations in various directions from the amplitudes of the coefficients at this position in the various detail sub-bands and coefficients close to this position in the various detail sub-bands and means of detecting the signature from at least some binary information inserted in a plurality of positions in the image and information representing local amplitude variations in various directions corresponding to the positions of the binary information.

Thus, by taking account of the information representing the local amplitude variations in various directions corresponding to the positions of the binary information, it is possible to determine, amongst the binary information included in the image, that which is liable to be the most reliable.

According to another aspect of the invention, the binary information used for the detection is the binary information included at positions in the image for which the information representing the local amplitude variations in the various directions corresponds to information representing predetermined amplitude variations.

According to another aspect of the invention, weightings are allocated to at least some of the binary information, the weightings being allocated according to the information representing the amplitude variations at the positions corresponding to the positions of the binary information.

The invention also concerns the computer program stored on an information medium, the said program comprising instructions for implementing the watermarking and/or signature detection methods previously described, when they have been loaded into and executed by a computer system.

The invention also concerns an information medium comprising at least one image watermarked according to the watermarking method according to the present invention.

The characteristics of the invention mentioned above, as well as others, will emerge more clearly from the reading of the following description of an example embodiment, the said description being in relation to the accompanying drawings, amongst which:

DETAILED DESCRIPTION OF PREFERRED EMBODIMENT

Figure 1:
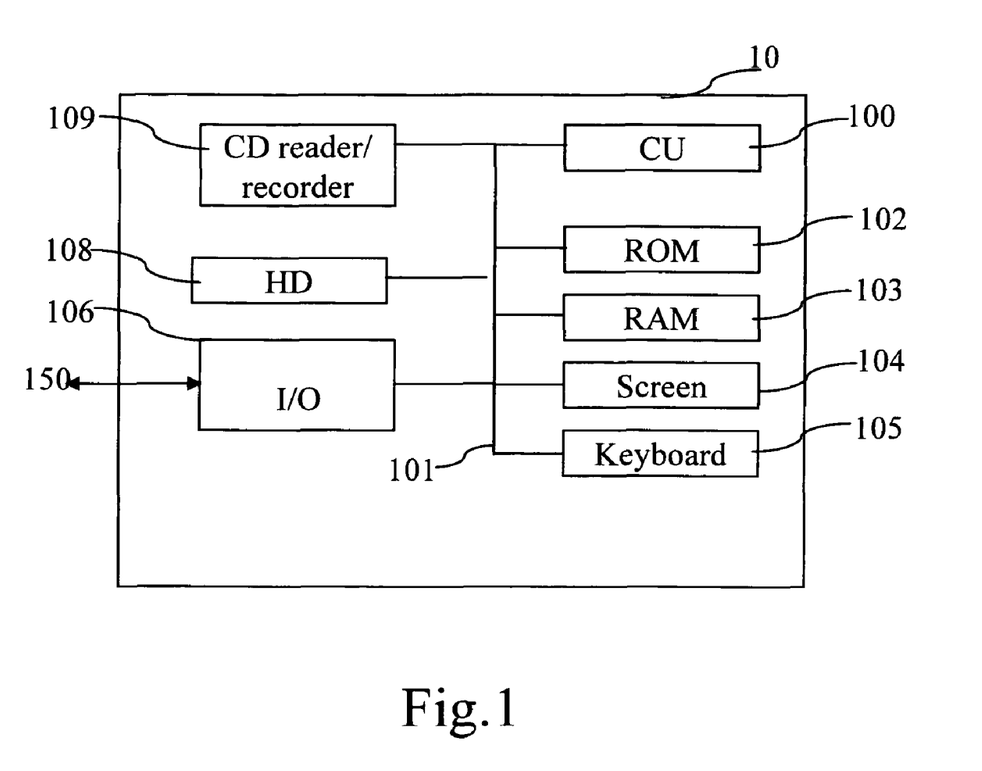
FIG. 1 depicts a block diagram of a device for watermarking an image and/or detecting a signature inserted in a color image.

FIG. 1 depicts a block diagram of a device for watermarking a color image and/or detecting a signature inserted in a color image.

The device 10 for watermarking a color image and/or detecting a signature inserted in a color image according to the present invention is for example a computer. The watermarking device 10 can also be integrated in a mobile telephone set comprising image capture means.

The watermarking device 10 comprises a communication bus 101 to which there are connected a processor 100, a read-only memory ROM 102, a random access memory RAM 103, a screen 104 and a keyboard 105 serving as a man/machine interface, a hard disk 108, a drive 109 for recording information on a removable medium such as a compact disk, and an interface 106 for transferring images watermarked according to the present invention onto a telecommunication network 150 and/or receiving color images in order to detect whether a watermark has been inserted in these images.

The read-only memory ROM 102 stores the programs implementing the invention. When the watermarking device 10 is powered up, the programs according to the present invention are transferred into the random access memory 103, which then contains the executable code of the algorithms which will be described subsequently with reference to FIGS. 2, 3, 4 and 7. The read-only memory ROM 102 also comprises a table which will be described subsequently with reference to FIG. 6.

Figure 6:
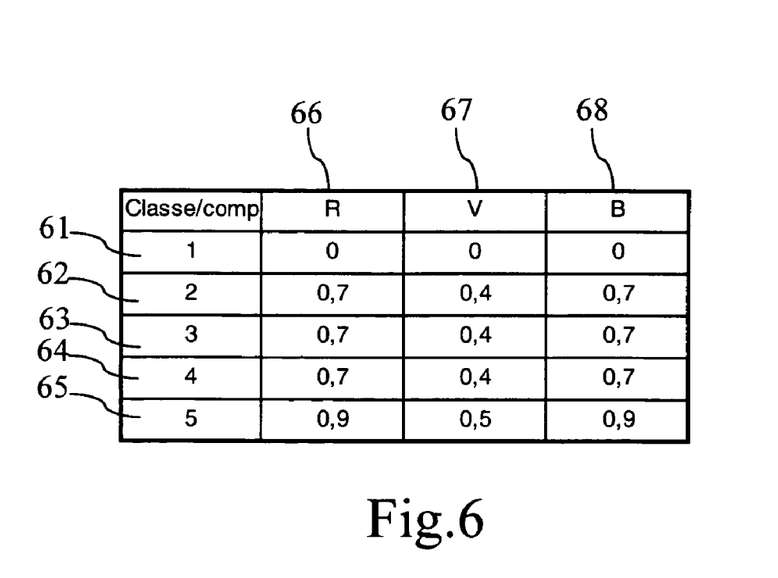
FIG. 6 shows a table comprising various watermarking strengths used by the present invention according to the information representing local amplitude variations in various directions.

The processor 100 executes the instructions stored in the random access memory 103 in accordance with the present invention The watermarking device 10 comprises a screen 104 and a keyboard 105 for selecting images to be watermarked according to the present invention or modifying for example the number of classes used by the present invention to determine the local amplitude variations in various directions around a position of the image or modifying the values of the watermarking strengths included in the table in FIG. 6.

Figure 2:
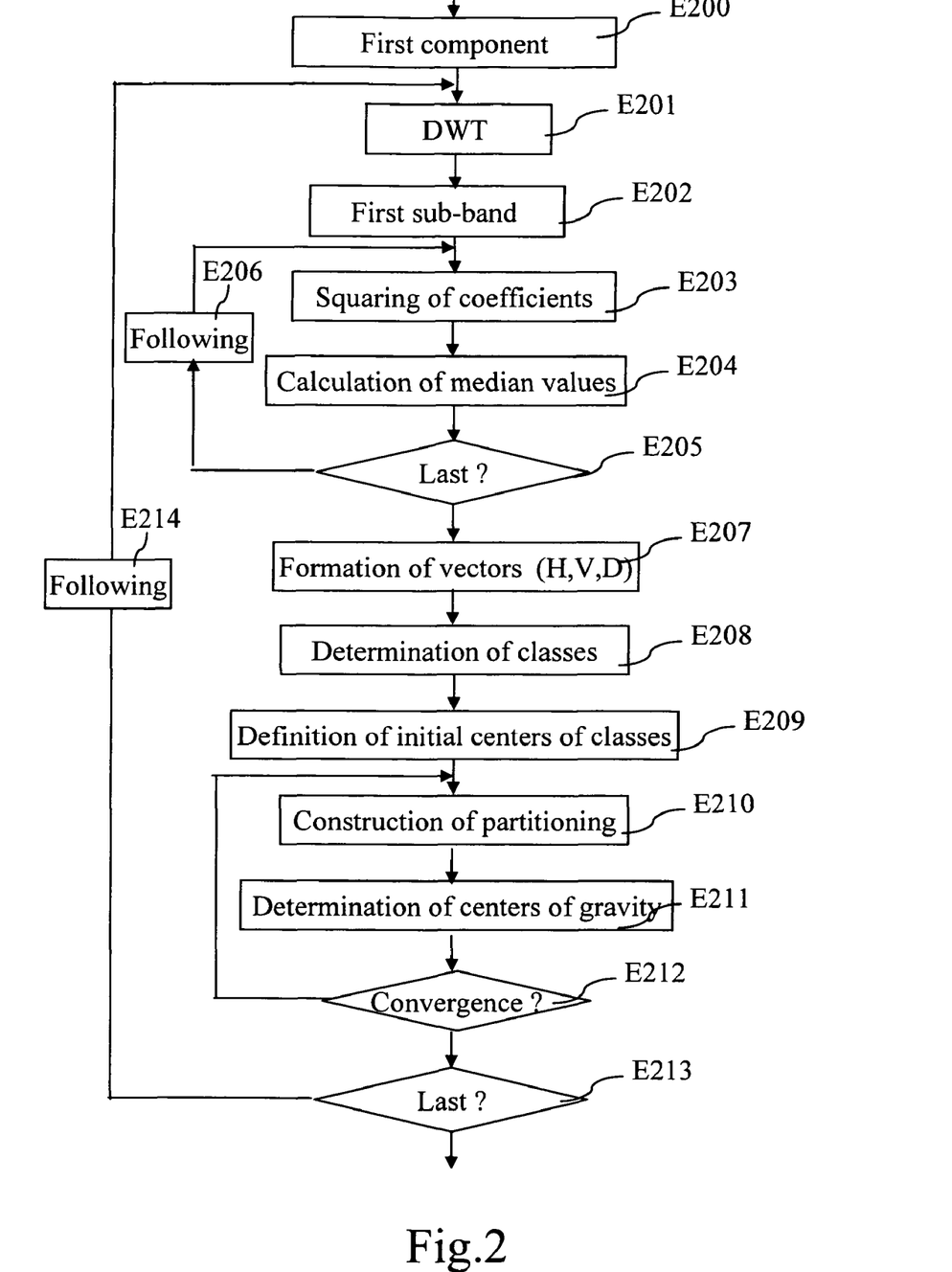
FIG. 2 depicts an algorithm for determining, for a plurality of positions in the image, information representing local amplitude variations in various directions.

FIG. 2 depicts an algorithm for determining, for a plurality of positions in the image, information representing local amplitude variations in various directions.

The processor 100 of the device 10 for watermarking and/or detecting a signature reads, from the read-only memory ROM 102, the instructions of the program corresponding to steps E200 to E214 in FIG. 2 and loads them into the random access memory 103 in order to execute them.

The image to be watermarked is a color image consisting of pixels and comprises several components. The components are for example chromatic components such as for example the red, green and blue components. Other chromatic components such as yellow, cyan and magenta can also be used.

The image can also be represented in the form of one luminance component and two chromatic components.

At step E200, the processor 100 takes a first component of the color image to be processed and at step E201 effects a transformation of this component of the image. This transformation is a wavelet decomposition or Discrete Wavelet Transform.

The wavelet decomposition is preferentially a Haar wavelet decomposition. This is because the Haar wavelet is particularly well suited to determining information representing local amplitude variations in an image since it does not reveal edge effects on the image whilst being simple in its implementation.

The decomposition of an image, or more precisely of a component of the image, is effected by applying to the image two digital filters, respectively low pass and high pass, which filter the signal in a first direction, for example horizontal.

After filtering, the two filtered images are decimated by two. Each decimated image is respectively applied to a low-pass filter and a high-pass filter, which filter it in a second direction, for example vertical. Each resulting filtered signal is then decimated by two in order to form four resolution sub-bands.

A sub-band comprises the coefficients of low frequency in both directions of the image signal. This sub-band is conventionally referred to as the low sub-band of the first decomposition level.

The other three sub-bands, known as detail sub-bands, comprise the high-frequency wavelet coefficients in the respective horizontal, vertical and diagonal directions.

Each of these detail sub-bands, constructed from the original image, contains information corresponding to a respectively vertical, horizontal and diagonal orientation of the image in a given frequency band.

The decomposition effected is such that a sub-band of a given resolution is divided into four sub-bands of lower resolution and therefore has four times as many coefficients as each of the sub-bands of immediately lower resolution.

To four coefficients at a position (2x, 2y) in a sub-band of given resolution there corresponds a coefficient in each sub-band of lower resolution obtained at a position (x,y).

Thus, to a coefficient situated at given position (x,y) in a sub-band, there correspond coefficients at the same position (x,y) in the other respective sub-bands of the same decomposition level. To these coefficients situated at a given position (x,y) there correspond four other coefficients at a position (2x, 2y) in the low-frequency sub-band of higher decomposition level.

Thus, to a position in a sub-band there corresponds a position in the original image in the form of a pixel and/or there corresponds a position in a sub-band of a different decomposition level.

When the image is decomposed into two decomposition levels, the low sub-band of the first decomposition level is decomposed a further time according to the same decomposition as that described previously in order to form a low sub-band of a second decomposition level and three detail sub-bands comprising high-frequency wavelet coefficients in the respective horizontal, vertical and diagonal directions.

At each new decomposition, the low sub-band of the lowest decomposition level is used to form a new low sub-band of a lower decomposition level and three detail sub-bands comprising high-frequency wavelet coefficients in the respective horizontal, vertical and diagonal directions.

According to a preferred embodiment of the present invention, the decomposition is carried out on four decomposition levels in order to obtain four sub-bands of a fourth decomposition level. For each detail sub-band of the fourth decomposition level, the high-frequency wavelet coefficients are stored in the respective horizontal, vertical and diagonal directions.

Once the decomposition has been carried out, the processor 100 at step E202 considers a first detail sub-band in a direction previously obtained.

At the following step E203, the processor 100 squares the amplitude of each coefficient of the sub-band in question.

This makes it possible to introduce a concept of energy to the coefficients of the sub-band. They can then be considered to be indicators of the change in energy in the image.

At the following step E204, the processor 100 determines a median value of each coefficient of the sub-band in question whose amplitude was previously squared.

This median value is for example calculated on a medium of size three by three, that is to say the median value is determined from the amplitude of the coefficients adjoining the coefficient for which the determination is carried out. This median calculation has the effect of revealing the zones of the detail sub-band in a direction which includes high variations, that is to say textured zones.

Once this operation is performed, the processor 100 passes to the following step E205 and checks whether all the detail sub-bands have been processed.

In the negative, the processor 100 passes to step E206 and reiterates the loop consisting of steps E203 to E206 until the three detail sub-bands are processed.

When the three detail sub-bands comprising the high-frequency wavelet coefficient in the respective horizontal, vertical and diagonal directions have been processed, the processor 100 passes to the following step E207.

At step E207, the processor 100 forms, for each position (x,y) of the detail sub-bands of the fourth decomposition level, a dimension 3 vector representing the intensity of the local fluctuations.

At each position (x,y), the vector formed has as its coordinates the median value determined previously at the position (x,y) for the detail sub-bands comprising high-frequency wavelet coefficients in the horizontal direction, the median value determined previously at the position (x,y) for the detail sub-bands comprising high-frequency wavelet coefficients in the vertical direction and the median value determined previously at the position (x,y) for the detail sub-bands comprising high-frequency wavelet coefficients in the diagonal direction.

Once the vectors are formed, the processor 100 at step E208 defines the classes according to which the vectors formed at the previous step will be classified.

For example, five classes are defined.

The class denoted class 1 contains the vectors representing zones not comprising any variations, that is to say the vectors whose coordinates are of low value.

Class 2 contains the vectors representing zones of the image comprising variations that are mostly horizontal, that is to say the vectors whose median-value coordinate calculated in the detail sub-bands comprising high-frequency wavelet coefficients in the horizontal direction has a high value whilst the median values calculated in the other detail sub-bands are of low value.

Class 3 contains the vectors representing zones of the image comprising variations that are mainly vertical, that is to say the vectors whose median-value coordinate calculated in the detail sub-bands comprising high-frequency wavelet coefficients in the vertical direction has a high value, whilst the median values calculated in the other detail sub-bands are of low value.

Class 4 contains the vectors representing zones of the image comprising variations that are mainly diagonal, that is to say the vectors whose median value coordinate calculated in the detail sub-bands comprising high-frequency wavelet coefficients in the diagonal direction has a high value, whilst the median values calculated in the other detail sub-bands are of low value.

Class 5 contains the vectors representing zones of the image that are very highly textured and without any predominant direction, that is to say the vectors which have each of their coordinates at a high value.

It should be remarked here that the number of classes may be reduced. In particular, classes 2, 3 and 4 can in a variant be grouped together in a single class.

In a variant, the number of classes can also be increased. Other classes containing the vectors representing zones of the image comprising variations in two directions can also be formed.

The use of five classes is preferred according to the present invention and allows precise detection of the textures included in the image to be processed. Even the textures whose direction is mainly diagonal can be detected, although conventionally the energy associated with these diagonals is lower than those associated with the other directions.

Once step E208 has been performed, the processor 100 will next, at steps E209 to E212, classify the zones of the image to be processed, that is to say group the vectors in zones from the previously defined classes.

The processor 100 will thus group together the vectors whose coordinates are similar in the five predetermined classes.

The method used is for example the dynamic clouds method.

Naturally other methods can also be used.

For this purpose, the processor 100 determines, at step E209, an initial center for each of the classes 1 to 5.

For class 1, the processor 100 takes the null vector denoted g0 as the initial center.

For class 2, the processor 100 forms an initial center g1 whose coordinates are (MaximumH, 0, 0) where MaximumH is the maximum median value for the detail sub-bands comprising high-frequency wavelet coefficients in the horizontal direction.

For class 3, the processor 100 forms an initial center g2 whose coordinates are (0, MaximumV, 0) where MaximumV is the maximum median value for the detail sub-bands comprising high-frequency wavelet coefficients in the vertical direction.

For class 4, the processor 100 forms an initial center g3 whose coordinates are (0, 0, MaximumD) where MaximumD is the maximum median value for the detail sub-bands comprising high-frequency wavelet coefficients in the diagonal direction.

For class 5, the processor 100 forms an initial center g4 whose coordinates are (MaximumH, MaximumV, MaximumD).

Once the initial centers are defined, the processor 100 passes to the following step E210.

At this step, the processor 100 constructs a partitioning of the image into zones affecting each vector formed at step E207 at the class whose initial center it is closest to.

At the following step E211, the processor 100 determines a new initial center representing each zone from vectors that were allocated respectively to each zone.

Once this operation is performed, the processor 100 determines whether the quality of the distribution is improved or not.

The affirmative, the processor 100 returns to step E210 and reiterates steps E210 and E212 as long as the quality of the distribution is improved.

When the quality of the distribution is no longer improved, the processor 100 passes to step E213.

At step E213, the processor 100 checks whether all the components of the image have been processed.

If not, the processor 100 passes to step E214, takes another component and returns to step E201 to process the new component of the color image.

When all the components have been processed, a class is associated with each position (x,y) of each detailed sub-band of each component.

This class corresponds to a local determination of the texture of the image at a position (x,y).

It should be noted here that the segmentation as performed by the algorithm in FIG. 2 aims to terminate the zones of the image having textures, whatever the principle direction of the textures included in the image.

It should be noted here that, in a variant, a single component can be processed. For example, when the image is formed for a luminous component and chromatic components, the present algorithm is implemented only on the luminance component.

Thus the processor 100 of the watermarking device has determined, for each position of the detail sub-bands of the lowest resolution level, information representing variations in the local amplitudes in various directions of the coefficients of the detail sub-bands from the amplitudes of the coefficients respectively at this position and the amplitudes of the coefficients close to this position.

The processor 100 has also determined various texture zones from the lowest resolution level.

From these texture zones determined, it is then possible to determine, for the detail sub-bands of higher resolution level and for the original image and for each position of the image, information representing variations in the local amplitudes in various directions.

Thus the present algorithm defines, for each position of an image or of a decomposition sub-band, the local amplitude variations in the image or a sub-band. The present algorithm thus makes it possible to allocate a class to each position of an image or of a decomposition sub-band.

Figure 3:
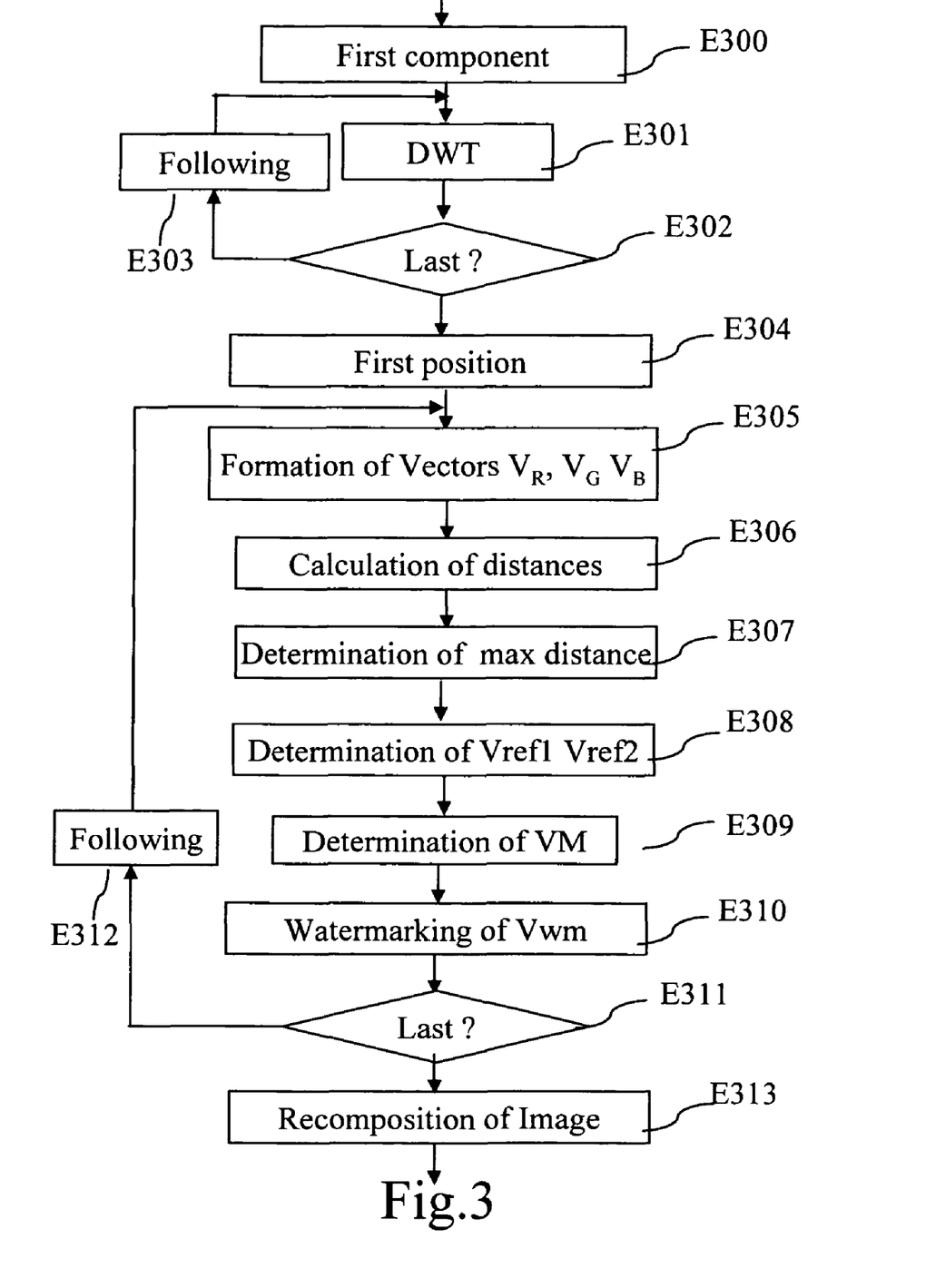
FIG. 3 depicts the algorithm for watermarking a color image.

FIG. 3 shows the algorithm for producing a watermark in a color image.

The processor 100 of the device 10 for inserting a watermark in a color image reads, from the read-only memory ROM 102, the instructions of the program corresponding to steps E300 to E313 of FIG. 3 and loads them into random access memory 103 in order to execute them.

The image to be watermarked is a color image consisting of pixels and comprises several chromatic components, for example the red, green and blue components. The image can also be represented in the form of one luminance components and two chromatic components.

At step E300, the processor 100 takes a first component of the color image to be processed and, at step E301 effects a transformation of this component of the image. This transformation is a wavelet decomposition.

The wavelet decomposition is preferentially a Daubechies wavelet decomposition. This is because Daubechies wavelets use filters relating to a larger number of samples than the filters used for a Haar wavelet decomposition. They thus offer better results for the decomposition of the images into sub-bands.

For example, the wavelet decomposition is performed on four decomposition levels.

It should be remarked here that the number of decomposition levels chosen for inserting a watermark in an image can also be different from the number of decomposition levels chosen for the algorithm for determining information representing local amplitude variations in various directions previously described with reference to FIG. 2.

When the wavelet decomposition has been performed, the processor 100 passes to the following step E302 and checks whether all the components of the color image have been decomposed into wavelets.

If not, the processor 100 passes to step E303, considers the following component and returns at step E310 to decompose a new component of the color image in the same way as that described above.

The processor 100 reiterates the loop consisting of steps E301 to E302 as long as not all the components of the image have been decomposed.

When all the components of the color image have been processed, the processor 100 passes to step E304.

At this step, the processor 100 takes, for each component of the image to be processed, the first corresponding coefficient of each detail sub-band of the last decomposition level. These first coefficients correspond to the first position (x,y) processed.

At the following step E305, the processor 100 forms, for the position (x,y) of the detail sub-bands of the last decomposition level, dimension 3 vectors whose coordinates are the values of the high-frequency wavelet coefficients of the detail sub-bands for each component of the image.

Thus, for a position (x,y), a vector is determined for each component of the color image to be processed.

For example, when the color image is in the form of three components, red, green and blue, the vectors are of the form:

$$V_i(x,y) = (\text{Coeff } H_{4i}(x,y), \text{Coeff } V_{4i}(x,y), (\text{Coeff } D_{4i}(x,y))$$

where i represents the red, green or blue component.

Coeff H4i(x,y) represents the coefficient of the fourth detail sub-band in the horizontal direction, Coeff V4i(x,y) represents the coefficient of the fourth detail sub-band in the vertical direction and Coeff D4i(x,y) represents the coefficient of the fourth detail sub-band in the diagonal direction.

Once the vectors are formed, the processor 100 passes to step E306 and calculates, for the current position (x,y) at a Euclidian distance between each of the three vectors taken in pairs:

$$D_{RB}(x,y) = |V_R(x,y) - V_B(x,y)|$$

$$D_{RG}(x,y) = |V_R(x,y) - V_G(x,y)|$$

$$D_{BG}(x,y) = |V_B(x,y) - V_G(x,y)|$$

Once this operation has been performed, the processor 100 passes to step E307 and determines, for the current position (x,y), the greatest of the distances $D_{RB}(x,y)$, $D_{RG}(x,y)$ and $D_{BG}(x,y)$ calculated previously at step E306.

At the following steps E308 and E308, the processor 100 determines, for the current position (x,y), the vectors serving as a reference for the marking of the vectors to be marked as well as the vector amongst the three vectors $V_R(x,y)$, $V_G(x,y)$, $V_B(x,y)$ which will be used for the marking or watermarking.

If $D_{RB}(x,y) > D_{RG}(x,y)$ and $D_{RB}(x,y) > D_{BG}(x,y)$ the vector $V_G(x,y)$ is chosen or selected as the vector VM comprising the watermark and the vectors $V_R(x,y)$ and $V_B(x,y)$ are considered to be reference vectors denoted respectively Vref1 and Vref2.

If $D_{RG}(x,y) > D_{RB}(x,y)$ and $D_{RG}(x,y) > D_{BG}(x,y)$ the vector $V_B(x,y)$ is chosen or selected as the vector VM comprising the watermark and the vectors $V_R(x,y)$ and $V_G(x,y)$ are considered to be reference vectors denoted respectively Vref1 and Vref2.

If $D_{BG}(x,y) > D_{RB}(x,y)$ and $D_{BG}(x,y) > D_{RG}(x,y)$, the vector $V_R(x,y)$ is chosen or selected as the vector VM comprising the watermark and the vectors $V_B(x,y)$ and $V_G(x,y)$ are considered to be reference vectors denoted respectively Vref1 and Vref2.

Once these operations have been performed, the processor 100 passes to the following step E310 and inserts binary information at the current position (x,y) on the vector VM previously determined as having to comprise the binary information. This step of inserting binary information on the vector VM corresponding to a position will be explained in more detail with regard to FIG. 4.

Once this operation has been performed, the processor passes to step E311 and checks whether the current position is the last of the positions to be processed.

If not, the processor 100 takes, at step E312, for each component of the image to be processed, the coefficient at the corresponding following position of each detail sub-band of the last decomposition level.

As long as all the coefficients of the detail sub-bands have not been processed, the processor 100 reiterates the loop consisting of step E305 to E312.

When all the coefficients of the detail sub-bands have been processed, the processor 100 passes to step E313 and reconstructs the image, taking account of the coefficients marked by the insertion of the watermark.

Once this operation has been performed, the algorithm stops and resumes at step E300 when a new watermark is to be inserted in a new image.

Figure 4:
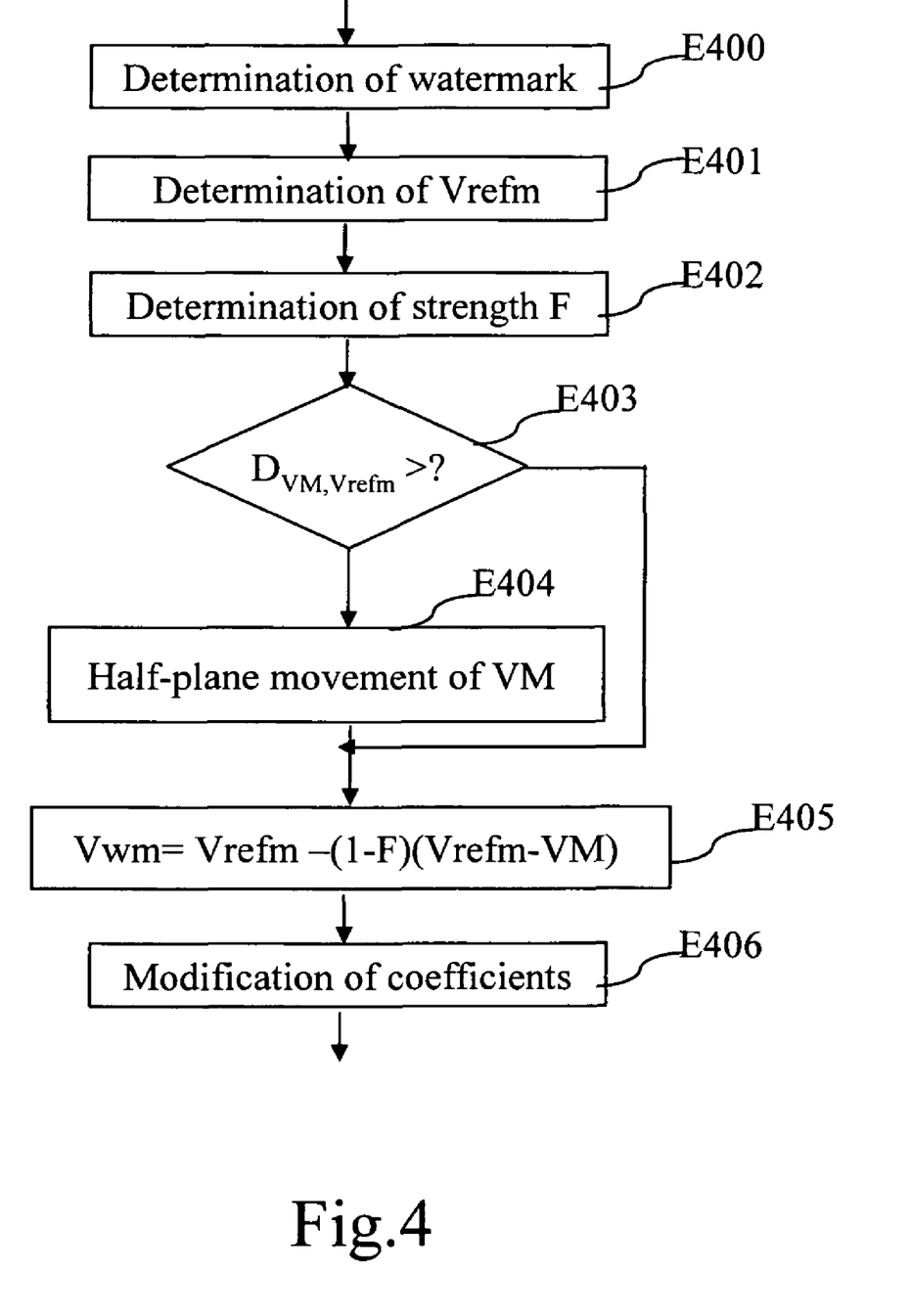
FIG. 4 depicts a detailed algorithm of the step of inserting binary information at a position on the lowest resolution level of the image to be watermarked.

FIG. 4 depicts a detailed algorithm of step E310 of FIG. 3 of inserting binary information at a position at the lowest resolution level of the image to be watermarked.

The algorithm in FIG. 4 describes the modification of the coordinates of the vector VM determined at step E309 of FIG. 3 as comprising binary information for a position of the detail sub-bands.

At step E400, the processor 100 determines the binary information to be inserted at the current position in the course of processing.

To each of the detail sub-bands there corresponds binary information to be inserted.

A pseudo-random signature S is generated by means of a key.

Figure 5:
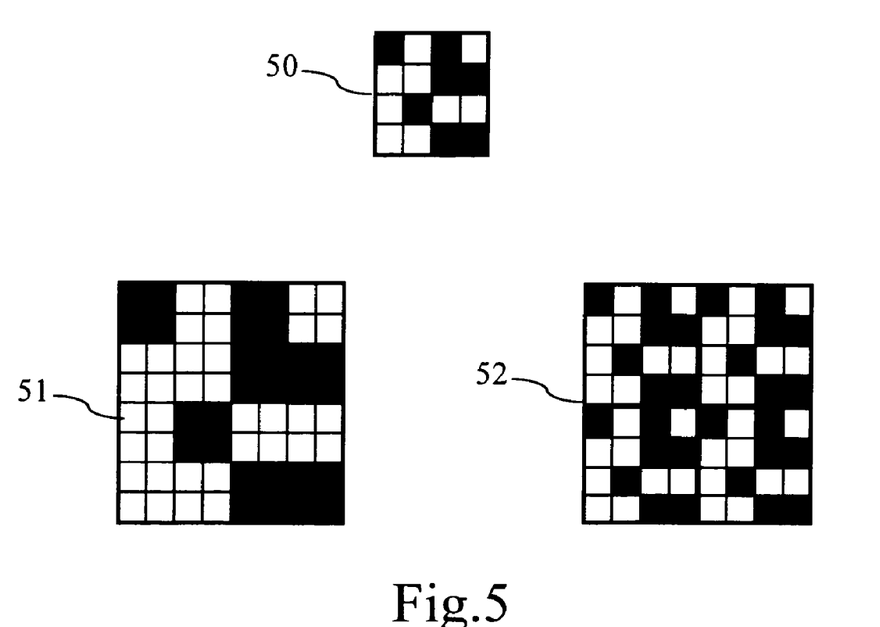
FIG. 5 is an example of a watermark created by redundancy of a signature generated by a key in a pseudo-random manner.

This signature S denoted 50 in FIG. 5 consists of a series of binary information of a size N*N.

This signature can also represent the name of the author, the name of the proprietor of the image, the content of the image or any type of information.

The binary information is represented in FIG. 5 by black or white squares. The black squares of the signatures represent binary information to the binary value 1 whilst the white squares represent binary information to the binary value 0.

The signature S comprises a limited number of items of information with respect to the number of positions in the detail sub-bands. The signature S is duplicated so that an item of binary information to be inserted is associated with each sub-band position with the lowest resolution or with each vector VM.

This is because, the more this signature will be inserted in a redundant fashion a large number of times in the detail sub-band, the greater with be the robustness of the watermarking.

The duplication can be effected bit by bit like the redundancy denoted 51 in FIG. 5 or signature by signature as illustrated at 52 in FIG. 5.

The number of repetitions of the signature 40 is determined by the ratio between the size of the decomposition sub-band of the lowest level and the size of the signature.

Thus a binary value to be inserted corresponds to each position of the detail sub-bands.

The processor therefore determines at this step the corresponding binary information 0 or 1 that must be inserted at this position.

Once this operation has been performed, the processor 100 determines, at step E401, amongst the two reference vectors Vref1 and Vref2, the watermarking reference vector denoted Vrefm used for the modification of the vector VM determined at step E309 of FIG. 3 as comprising the watermark for a position on the detail sub-bands.

This is because the watermarking according to the present invention is effected by modifying the vector VM so as to bring it closer to the reference vector Vref1 or Vref2 according to the value of the binary information to be inserted or according to certain predefined conventions.

More precisely, the vector VM is modified in such a way that the distance of the watermarking reference vector Vrefm is less than the distance of the other reference vector.

For example, the following convention can be taken:

If VM is the vector $V_R(x,y)$ and the value of the binary information to be inserted is at zero, the vector VM must be brought closer to the vector $V_G(x,y)$. The vector Vrefm is then the vector $V_G(x,y)$.

If VM is the vector $V_R(x,y)$ and the value of the binary information to be inserted is at zero, the vector VM must be brought closer to the vector $V_B(x,y)$. The vector Vrefm is then the vector $V_B(x,y)$.

If VM is the vector $V_G(x,y)$ and the value of the binary information to be inserted is at zero, the vector VM must be brought closer to the vector $V_R(x,y)$. The vector Vrefm is then the vector $V_R(x,y)$.

If VM is the vector $V_G(x,y)$ and the value of the binary information to be inserted is at zero, the vector VM must be brought closer to the vector $V_B(x,y)$. The vector Vrefm is then the vector $V_B(x,y)$.

If VM is the vector $V_B(x,y)$ and the value of the binary information to be inserted is at zero, the vector VM must be brought closer to the vector $V_R(x,y)$. The vector Vrefm is then the vector $V_R(x,y)$.

If VM is the vector $V_B(x,y)$ and the value of the binary information to be inserted is at zero, the vector VM must be brought closer to the vector $V_G(x,y)$. The vector Vrefm is then the vector $V_G(x,y)$.

Once the watermarking reference vector has been determined, the processor 100 passes to the following step E402.

At this step, the processor 100 determines the watermarking strength F of the binary information to be inserted.

For this purpose, the processor 100 obtains the class to which the vector determined at step E208 for the current position belongs.

According to this class and the vector VM, the processor 100 determines for example from a table stored in read-only memory ROM 102 of the watermarking device 10 the watermarking strength of the binary information.

This table is for example in accordance with the table as depicted in FIG. 6.

The table in FIG. 6 comprises five lines denoted 61 to 65.

Line 61 comprises, for the various components of the image, the watermarking strengths associated with class 1 representing zones considered to be uniform.

Line 62 comprises, for the various components of the image, the watermarking strengths associated with class 2 representing zones textured in a mainly horizontal direction.

Line 63 comprises, for the various components of the image, the watermarking strengths associated with class 3 representing zones textured in a mainly vertical direction.

Line 64 comprises, for the various components of the image, the watermarking strengths associated with class 4 representing zones textured in a mainly diagonal direction.

Line 65 comprises, for the various components of the image, the values representing the watermarking strengths associated with class 5 representing highly textured zones.

The table in FIG. 6 comprises as many columns as there are components of the color image. According to our example, the table comprises three columns denoted 66 to 68.

Column 66 corresponds according to our example to the red component of the image to be processed and comprises, for each of the classes of the algorithm in FIG. 2, a value representing the watermarking strength for the red component.

Column 67 corresponds according to our example to the green component of the image to be processed and comprises, for each of the classes of the algorithm in FIG. 2, a value representing the watermarking strength for the green component.

Column 68 corresponds according to our example to the blue component of the image to be processed and comprises, for each of the classes of the algorithm in FIG. 2, a value representing the watermarking strength for the blue component.

The processor 100 determines the component of the image to be processed. This component is the component of the vector which was determined as the vector VM comprising the watermark. For example, if the vector $V_B(x,y)$ was determined at step E309 of the algorithm in FIG. 3 as the vector VM comprising the watermark, the component determined is the blue component.

The processor 100 next determines, for the component determined, to which class the position currently being processed belongs. This class was previously determined according to the algorithm in FIG. 2.

According to the component determined and the class to which the position currently being processed belongs, the processor 100 thus determines the value of the watermarking strength F to be applied to this position.

It should be noted that, in a variant, the watermarking strengths can be identical for each of the components.

The watermarking strength can also be determined in a variant by determining to which class the position currently being processed for the other components belongs. The processor 100, according to the present variant, checks whether the classes defined for each of the components are coherent.

If for example at this position the vectors formed at step E207 are all considered to belong to an identical class, the value of the watermarking strength is increased.

If on the other hand the component determined is the only one of the components considered to comprise information representing local amplitude variations in at least one direction, the value of the watermarking strength is reduced.

Once this operation has been performed, the processor 100 next passes to the following step E403.

At this step, the processor 100 determines whether the distance between the vector VM comprising the watermark and the reference watermarking vector Vrefm is greater than the distance between the vector VM comprising the watermark and the vector referenced Vref1 or Vref2 that was not considered to be the watermarking reference vector.

If not, the processor 100 passes to step E405.

If the distance between the vector VM comprising the watermark and the reference watermarking vector Vrefm is greater than the distance between the vector VM comprising the watermark and the reference vector Vref1 or Vref2 that was not considered to be the reference watermarking vector, the processor 100 passes to step E404.

At this step, the processor 100 modifies the vector VM so that the distance between the vector VM comprising the watermark and the reference watermarking vector Vrefm is less than the distance between the vector VM comprising the watermark and the reference vector Vref1 or Vref2 that was not considered to be the reference watermarking vector.

This modification is made so as to make the modification of the vector VM minimal.

Once this operation has been performed, the processor 100 passes to the following step E405.

At step E405, the processor 100 calculates the watermark vector Vwm according to the formula:

$$Vwm = Vrefm - (1-F)*(Vrefm - VM)$$

It should be noted here that the vector VM is the vector determined at step E309 of the algorithm in FIG. 3 or the vector VM moved at step E403, F the watermarking strength and Vrefm the reference watermarking vector.

In accordance with the values indicated in the table in FIG. 6, the watermarking strength F varies between values lying between 0 and 1.

When the watermarking strength is 0, that is to say when the position currently being processed is in a zone considered to be uniform, the watermarked vector is equal to the vector VM. No watermark is inserted for this position.

This is because the insertion of watermarks in the uniform zones of an image creates visually discernible disturbances. The algorithm according to the invention therefore inserts no watermark at the positions corresponding to the uniform zones.

When the watermarking strength F is close to unity, the vector VM comprising the watermark is almost replaced by the reference watermarking vector Vrefm.

This watermarking is particularly robust and resists any subsequent processing such as a compression of the image. This watermarking does on the other hand create disturbances in the discernible image. By effecting such a watermarking when the insertion is made in a highly textured zone of the image, the watermarking nevertheless remains invisible to the eye.

When the watermarking strength F is for example equal to one half, the watermarked vector Vwm is equal to the average of the two vectors VM and Vrefm. This allows a correct compromise between visibility and robustness of the watermark for zones textured in a predominant direction.

It should be noted here that the watermarking strength applied to the green component is, whatever the class to which the position currently being processed belongs, less than one half. This is because the green component makes it possible to better protect a watermark from any attacks but the human visual system is more sensitive to variations in this component.

It should be noted here that the watermarking strength applied to the red component or blue component is greater than one half when the class to which the position currently being processed belongs is a texture class. This is because the human visual system is less sensitive to variations in these components, and the watermark can then be inserted with a greater watermarking strength.

Once the vector Vwm has been calculated, the processor 100 passes to step 406 and modifies the coefficients of the detail sub-bands of the modified components corresponding to the coordinates of the watermark vector Vwm.

Once this operation has been performed, the processor 100 returns to step E311 of the algorithm in FIG. 3.

It should be noted here that the watermarking of the image is carried out by inserting binary information at each position and the algorithm in FIG. 2 does not define zones which must comprise the watermark, but allows determination for each position of an image of information representing local amplitude variations in various directions and to define a watermarking strength to be applied to each position.

Figure 7:
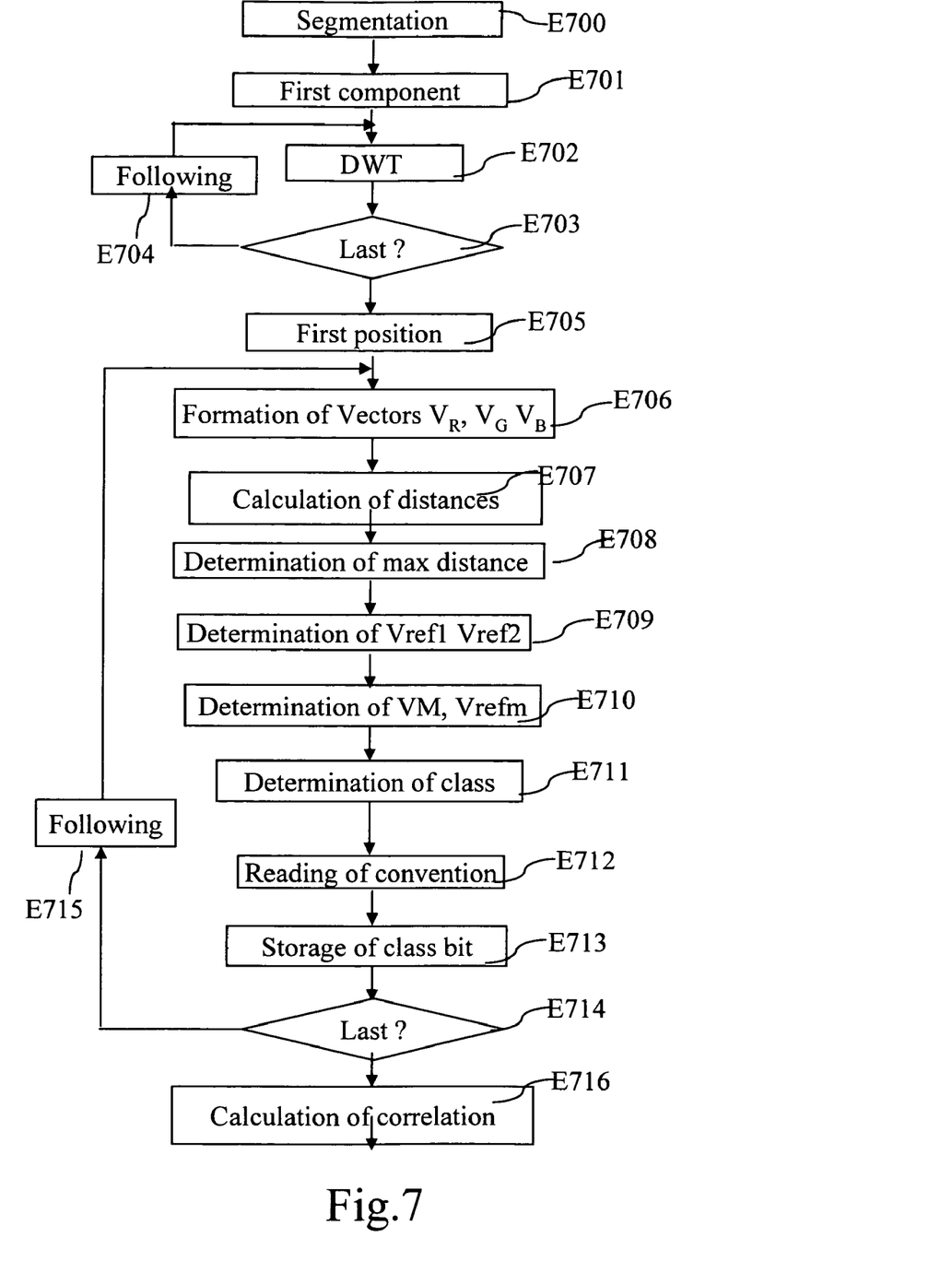
FIG. 7 depicts the algorithm for detecting a signature inserted in an image according to the watermarking algorithm according to the present invention.

FIG. 7 depicts the algorithm for detecting a signature inserted in an image according to the algorithm for watermarking according to the present invention.

The processor 100 of the device 10 for detecting a signature reads, from the read-only memory ROM 102, the instructions of the program corresponding to steps E700 to E716 of FIG. 7 and loads them into random access memory 103 in order to execute them.

At step E700, the processor 100 determines, for each position in the image in which a watermark has been inserted, information representing local amplitude variations in various directions. This step corresponds to the algorithm in FIG. 2 previously described. It will not be explained further.

Once this operation has been performed, the processor 100 passes to the following step E701.

Step E701 as well as steps E702, E703 and E704 are identical respectively to steps E300, E301, E302 and E303. They will not be described further.

The wavelet decompositions having been performed, the processor 100 passes to the following step E705.

At this step, the processor 100 takes, for each component of the image to be processed, the first coefficient corresponding to each detail sub-band of the last decomposition level. These first coefficients correspond to the first position (x,y) processed.

At the following step E706, the processor 100 forms, for the position (x,y) of the detail sub-bands of the last decomposition level, a vector for each component of the image to be processed. These vectors, of dimension 3, have as their coordinates the values of the high-frequency wavelet coefficient of the detail sub-bands for the respective components of the image. This step is identical to step E305 of FIG. 3. It will not be explained further.

Once the vectors have been formed, the processor 100 passes to step E707 and calculates for the current position (x,y) the Euclidian distance between each of the three vectors determined at step E706 taken in pairs. This step is identical to step E306 in FIG. 3. It will not be explained further.

Once this operation has been performed, the processor 100 passes to step E708 and determines for the current position (x,y) the greatest of the distances calculated previously at step E707.

At the following step E709, the processor 100 determines, for the current position (x,y), the vectors serving as a reference Vref1 and Vref2 for the watermarking of the vector to be watermarked. These vectors Vref1 and Vref2 are the vectors separated by the greatest distance calculated at step E708.

Once this operation has been performed, the processor 100 passes to the following step E710 and determines the vector VM that was used for the watermarking as well as the reference watermarking vector denoted Vrefm used for the modification of the vector VM. The vector VM is the vector that was not used as a reference vector at the previous step. The reference watermarking vector Vrefm is determined by choosing the vector, from amongst the reference vectors Vref1 and Vref2, which is the closest to VM.

Once this operation has been performed, the processor 100 determines at step E711 the class determined for the current position at step E700.

For this purpose, the processor 100 determines the class to which the vector formed at step E700 and having the same component as the vector VM belongs.

Five classes are used in the present invention, these classes are identical to classes 1, 2, 3, 4 and 5 explained above with reference to FIG. 2.

At the following step E712, the processor 100 determines the watermarking convention used during the inserting of the watermark in the image.

This is because, and according to the present invention, the watermarking is carried out by modifying the vector VM so as to bring it closer to the reference vector Vref1 or Vref2 according to the value of the binary information to be inserted.

The processor 100 thus deduces, according to the convention used, whether the value of the binary information inserted on the vector VM is equal to 1 or 0.

Once this operation has been performed, the processor 100 stores at step E713 the value of the binary information determined as well as the class determined at the previous step E711.

At the following step E714, the processor 100 checks whether each position of the detail sub-bands has been processed.

If not, the processor 100 passes to step E715 and takes, for each component of the image to be processed, the following coefficient of each detail sub-band of the last decomposition level. These coefficients correspond to the following position to be processed.

Once this operation has been performed, the processor 100 returns to step E716 previously described and reiterates steps E706 to E714 as long as not all the positions of the detail sub-bands have been processed.

When all the positions have been processed, the processor 100 passes to step E716.

At this step, the processor 100 obtains a signature from the binary information stored at the previous step E713.

When the watermark was inserted in the image, the signature S was duplicated so that an item of binary information was associated with each vector VM.

Knowing the duplication rule, the processor 100 obtains at least some of the binary information inserted for each bit of the signature and determines, for each bit of the signature, its mean value.

This is because only the binary information that was inserted at positions corresponding to classes 2, 3, 4 and 5 are used for calculating the mean value.

Class 1 groups together the non-textured positions of the image. When binary information is inserted in these non-textured zones, they are often inserted with a low watermarking strength.

Because of the manipulations that can be made on the image comprising the watermark, the risk of determining erroneous binary information at this position is high.

In order to guarantee good detection of the signature, the binary information included or liable to be included at these positions is therefore not taken into account.

In a variant, when the mean value of each bit of the signature is calculated, the processor 100 weights each item of binary information by a confidence factor determined according to the class corresponding to the position in which the binary information was obtained.

According to this variant, the binary information obtained at positions corresponding to class 5 were inserted with a higher watermarking strength than the other classes.

Having regard to the manipulations that can be made on the image comprising the watermark, the risk of determining erroneous binary information at positions corresponding to class 5 is low.

In order to guarantee better detection of the signature, a greater weight is allocated, at the calculation of the mean values, to the binary information obtained at positions corresponding to class 5 than to the other binary information.

The processor 100 next calculates the degree of resemblance between the original signature S that it has available and the signature S' obtained from the previously calculated mean values.

The calculation of the degree of resemblance cc(S,S') is for example of the form:

$$Cc(S, S') = \frac{\sum S(x, y) * S'(x, y)}{\sqrt{\sum S^2(x, y)} \sqrt{\sum S'^2(x, y)}}$$

The processor 100, according to the correlation thus calculated, determines whether or not the signature detected corresponds to the original signature.

If the degree of resemblance is greater than a predetermined threshold equal for example to the numerical value 0.7, the signature detected then corresponds to the original signature.

At the end of this step, the processor 100 returns to step E700 and awaits an image to be processed.

Naturally the present invention is in no way limited to the embodiments described here but quite the contrary encompasses any variant within the capability of a person skilled in the art.

The invention claimed is:

1. A method of inserting a watermark composed of a plurality of binary information in an image comprising at least three components, the method comprising of:
    decomposing at least one component of the image into detail sub-bands in various directions and comprising coefficients, each coefficient being characterized by its position in the detail sub-band to which it belongs and its amplitude;
    determining, for each position, information representing local amplitude variations in various directions from amplitudes of the coefficients at the position in the various detail sub-bands and coefficients close to the position in the various detail sub-bands;
    determining, a watermarking strength at each position from information representing local amplitude variations in various directions determined for the position;
    forming, for each position and for each decomposed component, a vector whose coordinates are the amplitudes of the coefficients at the position in the various detail sub-bands of the component;
    selecting, for each position, one vector amongst the vectors formed for the position;
    watermarking the image by modifying, for each position, the amplitude of the coefficients which are the coordinates of the vector selected for the position according to the binary information corresponding to the position and according to the watermarking strength determined for the position.

2. The method as claimed in claim 1, wherein each component of the image is decomposed into detail sub-bands in various directions, the information representing amplitude variations are determined for each component and, for each position, the watermarking strength is determined at each position of each component.

3. The method as claimed in claim 2, wherein the step of determining information representing local amplitude variations for each component and for each position further comprises the steps of:
    squaring the amplitude of each coefficient of each detail sub-band of each component,
    calculating a median value from the squared amplitudes of the coefficient and the coefficients close to the coefficient, for each coefficient of each detail sub-band of each component.

4. The method as claimed in claim 3, wherein the determination of the watermarking strength at each position of each component further comprises the steps of:
    forming a vector whose coordinates are median values calculated in each detail sub-band,
    grouping together vectors whose coordinates are similar in predetermined classes, and
    allocating a watermarking strength to each position according to the predetermined class to which the vector of the position belongs.

5. The method as claimed in claim 4, wherein the predetermined classes are the class containing the vectors representing zones not comprising any variations and/or the class containing the vectors representing zones of the image comprising mainly horizontal variations, and/or the class containing the vectors representing zones of the image comprising mainly vertical variations, and/or the class containing the vectors representing zones of the image comprising mainly diagonal variations, and/or the class containing the vectors representing zones of the image that are very highly textured and without any particular direction.

6. The method as claimed in claim 5, wherein the watermarking strength is also allocated according to the component of the image and the decomposition is a Haar wavelet decomposition.

7. The method as claimed in claim 6, wherein, during the watermarking step, each component of the image is decomposed, according to another decomposition into sub-bands, into sub-bands comprising coefficients, each coefficient being characterized by its position in the sub-band to which it belongs and its amplitude, and wherein the method also comprises a step of reconstructing the image from the coefficients of the sub-bands and the coefficients whose amplitudes were modified.

8. A method of detecting a signature inserted in an image comprising at least three components, comprising the steps of:
    decomposing at least one component of the image into detail sub-bands in various directions and comprising coefficients, each coefficient being characterized by its position in the detail sub-band to which it belongs and its amplitude;
    determining, for each position, information representing local amplitude variations in various directions from amplitudes of the coefficients at this position in the various detail sub-bands and coefficients close to this position in the various detail sub-bands;
    forming, for each position and for each decomposed component, a vector whose coordinates are the amplitudes of the coefficients at the position in the various detail sub-bands of the component;

determining, for each position, a vector comprising some binary information amongst the vectors formed for the position, and determining of inserted binary information;

detecting the signature from at least some binary information inserted in a plurality of positions in the image and information representing local amplitude variations in various directions corresponding to the binary information.

9. The method as claimed in claim 8, wherein the binary information used for the detection is the binary information included at positions on the image for which the information representing local amplitude variations in various directions corresponds to information representing predetermined local amplitude variations.

10. The method as claimed in claim 8, wherein the weightings are allocated to at least some of the binary information, the weightings being allocated according to information representing amplitude variations at the positions corresponding to the positions of the binary information.

11. A device for inserting a watermark composed of a plurality of binary information in an image comprising at least three components, the device comprising:

means of decomposing at least one component of the image into detail sub-bands in various directions and comprising coefficients, each coefficient being characterized by its position in the detail sub-band to which it belongs and its amplitude;

means of determining, for each position, information representing local amplitude variations in various directions form amplitudes of the coefficients at the position in the various detail sub-bands and coefficients close to the position in the various detail sub-bands;

means of determining a watermarking strength at each position from information representing local amplitude variations in various directions determined for the position;

means of forming, for each position and for each decomposed component, a vector whose coordinates are the amplitudes of the coefficients at the position in the various detail sub-bands of the component;

means of selecting, for each position, one vector amongst the vectors formed for the position;

means of watermarking the image by modifying, for each position, the amplitude of the coefficients which are the coordinates of the vector selected for the position according to the binary information corresponding to the position and according to the watermarking strength determined for the position.

12. A device for detecting a signature inserted in an image comprising at least three components, the device comprising:

means of decomposing at least one component of the image into detail sub-bands in various directions and comprising coefficients, each coefficient being characterized by its position in the detail sub-band to which it belongs and its amplitude;

means of determining, for each position, information representing local amplitude variations in various directions from amplitudes of the coefficients at this position in the various detail sub-bands and coefficients close to this position in the various detail sub-bands;

means of forming, for each position and for each decomposed component, a vector whose coordinates are the amplitudes of the coefficients at the position in the various detail sub-bands of the component;

means of determining, for each position, a vector comprising some binary information amongst the vectors for the position, and determining of inserted binary information;

means of detecting the signature from at least some binary information inserted in a plurality of positions in the image and information representing local amplitude variations in various directions corresponding to the binary information.

13. A computer program stored on computer-readable medium, said program containing instructions for implementing the watermarking method as claimed in claim 1, when it is loaded into and executed by a computer system.

14. A computer program stored on computer-readable medium, said program containing instructions for implementing the detection method as claimed in claim 8, when it is loaded into and executed by a computer system.

* * * * *